United States Patent
Kim et al.

(10) Patent No.: US 10,170,801 B2
(45) Date of Patent: Jan. 1, 2019

(54) SECONDARY BATTERY OF NOVEL STRUCTURE

(71) Applicant: LG CHEM, LTD., Seoul (KR)

(72) Inventors: Hee Gyu Kim, Cheongwon-gun (KR); Jung Hwan Kim, Cheongju-si (KR); Geon Tae Park, Busan (KR)

(73) Assignee: LG CHEM, LTD., Seoul (KR)

( * ) Notice: Subject to any disclaimer, the term of this patent is extended or adjusted under 35 U.S.C. 154(b) by 129 days.

(21) Appl. No.: 14/309,453

(22) Filed: Jun. 19, 2014

(65) Prior Publication Data
US 2014/0302372 A1    Oct. 9, 2014

Related U.S. Application Data

(63) Continuation of application No. PCT/KR2013/000866, filed on Feb. 4, 2013.

(30) Foreign Application Priority Data

Feb. 7, 2012  (KR) ........................ 10-2012-0012102

(51) Int. Cl.
| | |
|---|---|
| *H01M 10/42* | (2006.01) |
| *H01M 2/02* | (2006.01) |
| *H01M 2/04* | (2006.01) |
| *H01M 2/10* | (2006.01) |
| H01M 10/052 | (2010.01) |

(52) U.S. Cl.
CPC ....... *H01M 10/425* (2013.01); *H01M 2/0217* (2013.01); *H01M 2/0473* (2013.01);
(Continued)

(58) Field of Classification Search
CPC ............. H01M 10/425; H01M 2/1022; H01M 2/1061
(Continued)

(56) References Cited

U.S. PATENT DOCUMENTS

| 7,524,578 B2 | 4/2009 | Somatomo et al. |
| 2001/0006746 A1 | 7/2001 | Kageyama |
| | (Continued) | |

FOREIGN PATENT DOCUMENTS

| JP | 9-35748 A | 2/1997 |
| JP | 2008-192397 A | 8/2008 |
| | (Continued) | |

OTHER PUBLICATIONS

Machine Translation JP2011243352(A) (Year: 2011).*
International Search Report issued in PCT/KR2013/000866, dated May 13, 2013.

*Primary Examiner* — Jonathan G Leong
*Assistant Examiner* — Victoria H Lynch
(74) *Attorney, Agent, or Firm* — Birch, Stewart, Stewart, Kolasch & Birch, LLP

(57) ABSTRACT

A secondary battery pack includes a battery cell having an electrode assembly in a battery case with an electrolyte. An electrically insulative mounting member is mounted to a top of the battery cell. A protection circuit module (PCM) including a protection circuit board (PCB) is loaded on the electrically insulative mounting member. The PCB has a protection circuit, and a connection member (A) and a connection member (B) coupled to a bottom of the PCB. The connection member (A) and the connection member (B) are coupled to the electrode terminals of the battery cell. The PCB has a through hole, through which the connection member (B) is exposed, and an insulative cap coupled to an upper end of the battery cell to surround the electrically insulative mounting member where the connection members and the protection circuit board are loaded on the insulative cap.

18 Claims, 3 Drawing Sheets

(52) U.S. Cl.
CPC ....... *H01M 2/1022* (2013.01); *H01M 2/1061* (2013.01); *H01M 10/052* (2013.01); *H01M 10/4257* (2013.01); *H01M 2200/106* (2013.01); *H01M 2220/30* (2013.01)

(58) Field of Classification Search
USPC .......................................................... 429/121
See application file for complete search history.

(56) References Cited

U.S. PATENT DOCUMENTS

| | | | |
|---|---|---|---|
| 2009/0317715 A1* | 12/2009 | Jung | .................. H01M 2/0215 429/179 |
| 2010/0098973 A1 | 4/2010 | Lee et al. | |
| 2011/0020672 A1 | 1/2011 | Baek et al. | |
| 2011/0045322 A1 | 2/2011 | Baek et al. | |

FOREIGN PATENT DOCUMENTS

| | | | |
|---|---|---|---|
| JP | 2010-511280 | A | 4/2010 |
| JP | 2011-507181 | A | 3/2011 |
| JP | 2011-243352 | A | 12/2011 |
| KR | 10-2009-0039503 | A | 4/2009 |
| KR | 10-2010-0013466 | A | 2/2010 |
| KR | 10-2010-0089124 | A | 8/2010 |
| KR | 20-2011-0007761 | U | 8/2011 |
| TW | 557594 | | 10/2003 |
| TW | I265653 | B | 11/2006 |
| TW | 200937697 | A | 9/2009 |

\* cited by examiner

【FIG. 1】
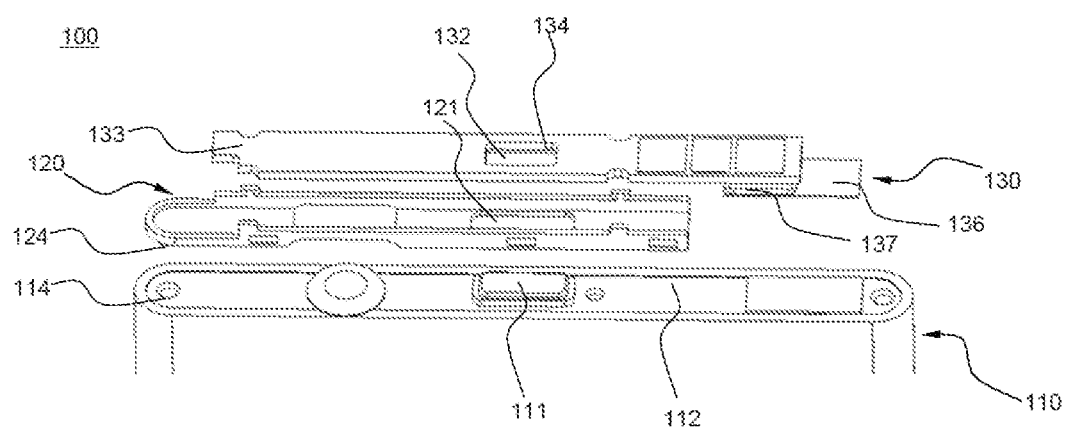
【FIG. 2】
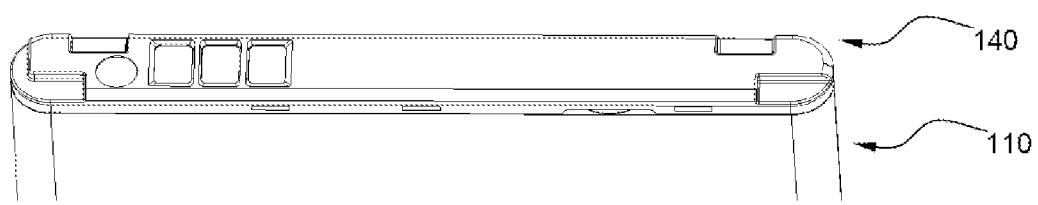

【FIG. 3】
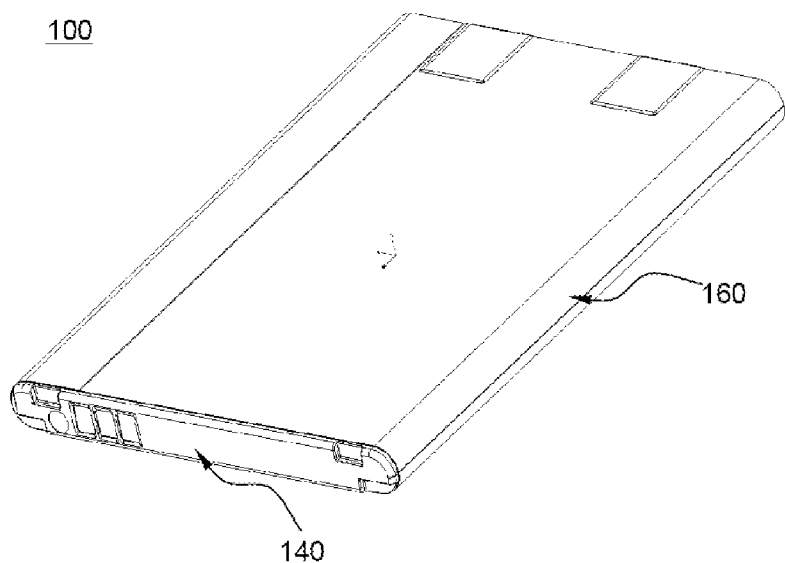
【FIG. 4】
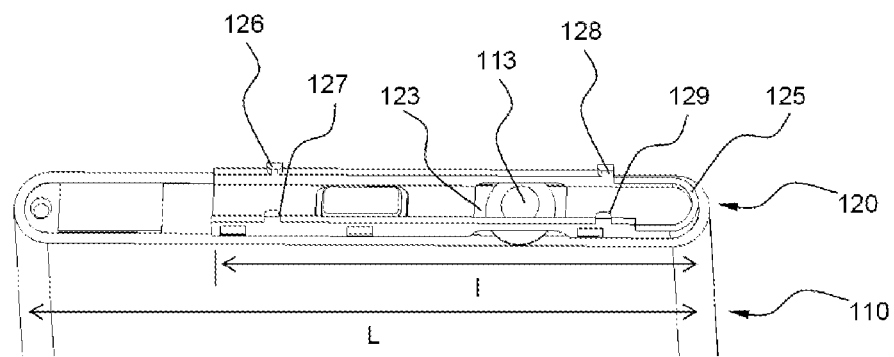

【FIG. 5】
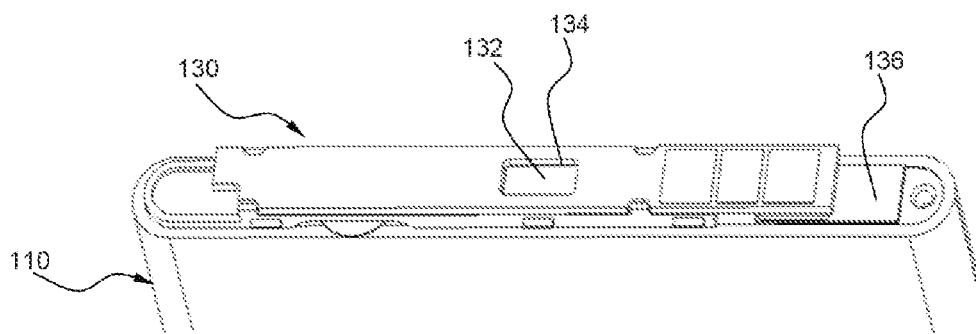
【FIG. 6】
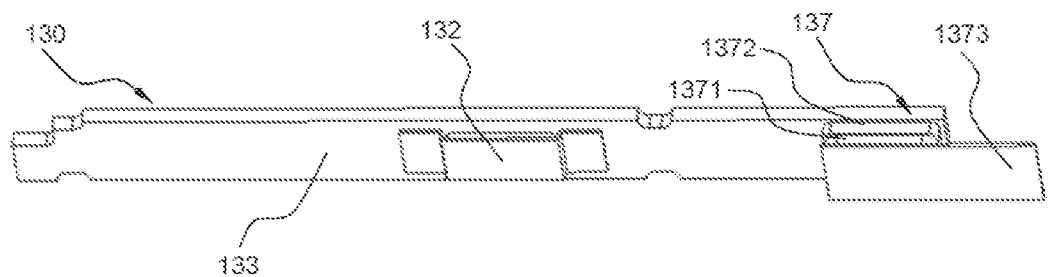
【FIG. 7】
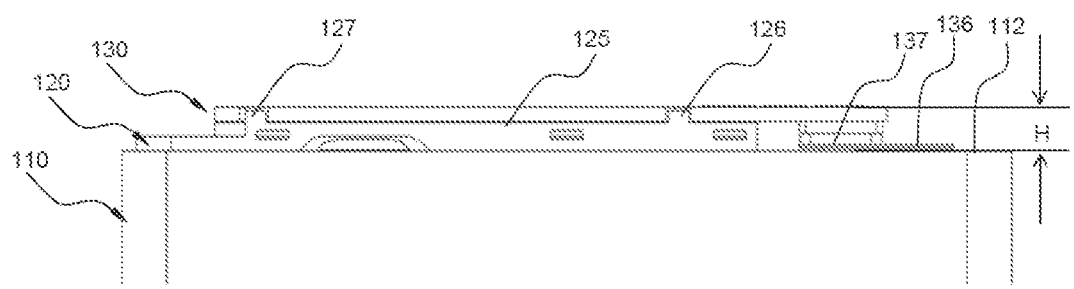

SECONDARY BATTERY OF NOVEL STRUCTURE

CROSS REFERENCE TO RELATED APPLICATIONS

This application is a Continuation of PCT International Application No. PCT/KR2013/000866 filed on Feb. 4, 2013, which claims priority under 35 U.S.C. § 119(a) to Patent Application No. 10-2012-0012102 filed in the Republic of Korea on Feb. 7, 2012, all of which are hereby expressly incorporated by reference into the present application.

TECHNICAL FIELD

The present invention relates to a secondary battery pack having a novel structure, and, more particularly, to a secondary battery pack including a battery cell having an electrode assembly disposed in a battery case together with an electrolyte in a sealed state, the battery cell having first and second electrode terminals formed at a top thereof, an electrically insulative mounting member having an opening, through which the second electrode terminal of the battery cell is exposed, the electrically insulative mounting member being mounted to a top of the battery cell, a protection circuit module (PCM) including a protection circuit board (PCB) loaded on the electrically insulative mounting member, the PCB having a protection circuit, and a connection member (A) and a connection member (B) coupled to a bottom of the PCB, the connection member (A) being connected to the first electrode terminal of the battery cell via a safety element, the connection member (B) being coupled to the second electrode terminal of the battery cell, the PCB being provided with a through hole, through which the connection member (B) is exposed, and an insulative cap coupled to an upper end of the battery cell to surround the electrically insulative mounting member in a state in which the connection members and the protection circuit board are loaded on the insulative cap, wherein the sum of a height of the PCM and a height of the insulative cap is 3.0 mm or less.

BACKGROUND ART

As mobile devices have been increasingly developed, and the demand for such mobile devices has increased, the demand for secondary batteries has also sharply increased. Among such secondary batteries is a lithium secondary battery exhibiting high energy density and operating voltage and excellent charge retention and service-life characteristics, which has been widely used as an energy source for various electronic products as well as various kinds of mobile devices.

Depending upon kinds of external devices in which the lithium secondary battery is used, the lithium secondary battery may be configured to have a detachable type structure in which the lithium secondary battery can be easily inserted into and removed from the external devices or to have an embedded type structure in which the lithium secondary battery is embedded in the external devices. For example, the lithium secondary battery can be inserted or removed into or from a device, such as a mobile phone or a laptop computer, as needed. On the other hand, another device, such as an MPEG Audio Layer-3 (MP3) player, requires an embedded type battery pack due to the structure or capacity thereof However, various kinds of combustible materials are contained in a lithium secondary battery. As a result, the lithium secondary battery may be heated or explode due to overcharge of the lithium secondary battery, overcurrent in the lithium secondary battery, or other external physical impact applied to the lithium secondary battery. That is, the safety of the lithium secondary battery is very low. Consequently, safety elements, such as a positive temperature coefficient (PTC) element and a protection circuit module (PCM), to effectively control an abnormal state of the lithium secondary battery, such as overcharge of the lithium secondary battery or overcurrent in the lithium secondary battery, are loaded on a battery cell in a state in which the safety elements are connected to the battery cell.

Generally, the PCM is electrically connected to the battery cell via conductive nickel plates by welding or soldering. That is, nickel plates are connected to electrode tabs of the PCB by welding or soldering, and the nickel plates are connected to electrode terminals of the battery cell by welding or soldering. In this way, the PCM is connected to the battery cell to manufacture a battery pack.

It is required for the safety elements, including the PCM, to be maintained in electrical connection with the electrode terminals of the battery cell and, at the same time, to be electrically isolated from other parts of the battery cell. To this end, a plurality of insulative mounting members or other parts is necessary, which complicates an assembly process of the battery pack. In particular, the sum of the height of the PCM and the height of the insulative cap generally reaches 3 mm with the result that a space necessary to receive the battery cell is reduced.

Also, a large number of welding or soldering processes are required to configure a battery pack. However, the welding or soldering processes must be carried out with high precision because of the small structure of a secondary battery. As a result, defect possibility is great. In addition, product costs are increased due to the addition of these processes.

Consequently, there is a high necessity for a technology that is capable of reducing the number of members mounted to the upper end of a battery cell to simplify an assembly process, reducing the number of welding processes to reduce a defect rate, achieving stable coupling between members loaded on the upper end of the battery cell, and increasing the capacity of the battery cell while solving the above-mentioned conventional problems.

DISCLOSURE

Technical Problem

Therefore, the present invention has been made to solve the above problems and other technical problems that have yet to be resolved.

Specifically, it is an object of the present invention to provide a secondary battery pack, the number of parts of which is reduced, the assembly process of which is simplified, and which has a battery capacity greater than that of other battery packs having the same standard.

It is another object of the present invention to provide a protection circuit module (PCM) assembly having a novel structure, to which connection members are coupled in a specific structure such that the above secondary battery pack can be manufactured, and a insulative mounting member.

Technical Solution

In accordance with one aspect of the present invention, the above and other objects can be accomplished by the provision of a secondary battery pack including a battery cell having an electrode assembly of a cathode/separator/anode structure disposed in a battery case together with an electrolyte in a sealed state, the battery cell having first and second electrode terminals formed at a top thereof, an electrically insulative mounting member having an opening, through which the second electrode terminal of the battery cell is exposed, the electrically insulative mounting member being mounted to a top of the battery cell, a protection circuit module (PCM) including a protection circuit board (PCB) loaded on the electrically insulative mounting member, the PCB having a protection circuit, and a connection member (A) and a connection member (B) coupled to a bottom of the PCB, the connection member (A) being connected to the first electrode terminal of the battery cell via a safety element, the connection member (B) being coupled to the second electrode terminal of the battery cell, the PCB being provided with a through hole, through which the connection member (B) is exposed, and an insulative cap coupled to an upper end of the battery cell to surround the electrically insulative mounting member in a state in which the connection members and the protection circuit board are loaded on the insulative cap, wherein the sum of a height of the PCM and a height of the insulative cap is 3.0 mm or less.

That is, in the secondary battery pack according to the present invention, the connection member (B), exposed through the through hole of the PCB, is electrically connected to the second electrode terminal of the battery cell via the PTC element from the above, and the connection member (A) is electrically connected to the first electrode terminal of the battery cell, in a state in which the PCM is loaded on the electrically insulative mounting member. Consequently, electrical connection is achieved using a simple connection method. Also, the assembly operation is easily performed, thereby greatly improving manufacturing efficiency.

Also, the connection member (A) extending from one end of the PCM is not bent, and the connection member (B) does not need an additional loading space. Consequently, it is possible to minimize a dead space, caused as the connection members are bent for electrical connection of the safety element in the conventional art. Also, the sum of the height of the PCM and the height of the insulative cap is minimized, and therefore, it is possible to manufacture a secondary battery pack having higher energy density than other secondary battery packs having the same standard.

Specifically, in the secondary battery pack according to the present invention, the sum of the height of the PCM and the height of the insulative cap may be 3.0 mm or less. The minimum value of the sum of the height of the PCM and the height of the insulative cap is not particularly restricted. For example, the minimum value of the sum of the height of the PCM and the height of the insulative cap may be 1 mm.

The battery case requires easy machining and predetermined mechanical strength. For this reason, the battery case may be a prismatic metal container. Preferably, the battery case is an aluminum container or a stainless steel container.

In a preferred example, the second electrode terminal may be an anode terminal, and the first electrode terminal may be a cathode terminal. For example, a prismatic battery cell may be configured to have a structure in which an electrode terminal protruding from the top of the battery cell and a battery case of the battery cell form an anode terminal and a cathode terminal, respectively, and an insulation member, such as a gasket, is disposed between the anode terminal and the cathode terminal to insulate the anode terminal and the cathode terminal from each other. In the structure of the prismatic battery cell, therefore, the second electrode terminal may be an anode terminal protruding from the top of the battery case, and the first electrode terminal may be a cathode terminal formed at the top of the battery case excluding the anode terminal.

Coupling (electrical connection) between the connection members and the PCM may be achieved using various methods. Preferably, the connection members may be coupled to the bottom of the PCB using surface mount technology (SMT). The SMT prevents paste from remaining at the bottom of the PCB during soldering or the bottom of the PCB from being damage due to heat during welding. Also, the SNIT achieved accurate and reliable coupling as compared with a conventional welding or soldering method. For reference, the SMT is widely used to mount surface mount type parts on an electronic board, such as a printed circuit board (PCB).

In a preferred example, in the secondary battery pack according to the present invention, the connection member (B), which is formed of a nickel plate, may be coupled to the anode terminal using SMT, and the safety element may be coupled to the cathode terminal using SMT.

In another preferred example, the connection member (B) may be coupled to the bottom of the through hole of the PCB. That is, the connection member (B) can be coupled to the second electrode terminal through the through hole, thereby further simplifying the assembly process and minimizing the thickness of the PCM.

The safety element is an element, which is broken during conduction of overcurrent or the resistance of which increases with the increase of temperature. Preferably, the safety element is positive temperature coefficient (PTC) element. The PTC element serves to interrupt current at the upper end of the battery pack when the temperature of the battery pack abruptly rises due to an internal short circuit or the like. However, the safety element is not limited to the PTC element, For example, a bimetal or a fuse may be used as the safety element.

In the above structure, the PTC element may include a PTC body, a PCM coupling part coupled to a top of the PTC body, and a battery cell coupling part coupled to a bottom of the PTC body, and the battery cell coupling part may extend from one end of a PCM assembly in a horizontal direction in a protruding fashion such that the battery cell coupling part is exposed upward from the PCM assembly.

Meanwhile, the insulative mounting member may have a size in a horizontal direction less than that of the top of the battery cell in order to provide a region where the connection member (A) is connected to the battery cell, and the insulative mounting member may be further provided with a second opening, through which a case upper end protruding part ('sealed electrolyte injection port') of the battery cell is exposed upward.

Since the size of the insulative mounting member in the horizontal direction is less than that of the top of the battery cell, it is possible to easily secure a space necessary to locate the connection member (A) between one end of the PCM assembly and one end of the top of the battery cell.

A receiving sidewall may protrude upward from a top of the insulative mounting member and fastening protrusions may be vertically formed at the receiving sidewall such that the PCM assembly is stably mounted to the insulative mounting member.

That is, the upper end of the sidewall may be coupled to the PCM assembly while the upper end of the sidewall supports the PCM assembly.

Also, the fastening protrusions vertically formed at the receiving sidewall increases coupling force between the PCM assembly and the insulative mounting member, thereby effectively preventing the connection member (A) from being separated from the PCM assembly due to external force. The sum of a height of the receiving sidewall and heights of the protrusions may be equal to a height of the PCB.

Meanwhile, one or more fastening protrusions may protrude downward from a bottom of the insulative mounting member and fastening grooves corresponding to the fastening protrusions may be formed at the top of the top battery cell such that the insulative mounting member is stably mounted to he battery cell.

The coupling of the insulative mounting member to the top of the battery case may be achieved, for example, by bonding, thereby achieving easiness in assembly process of the battery pack and securing a more stable coupling state.

In addition to the insulative cap coupled to the upper end of the battery cell, an additional insulative cap (bottom cap) may be mounted to the lower end of the battery cell. A sheathing film may be attached to the outer surface of the battery case of the battery cell. Consequently, it is possible to protect the battery cell from external impact and to maintain electrical insulation of the battery cell. Preferably, the sheathing film is attached to the outer surface of the battery case of the battery cell such that the sheathing film surrounds a downward extension of the insulative cap The secondary battery pack according to the present invention may be variously applied irrespective of the kind or external shape of the battery cell. Preferably, the secondary battery pack according to the present invention is applied to a battery pack including a prismatic lithium secondary battery as a battery cell.

In accordance with another aspect of the present invention, there is provided a PCM assembly mounted to a battery cell, the PCM assembly including a PCM, connection members (A and B) coupled to a bottom of the PCM using SMT, and external input and output terminals formed at a top of the PCM, wherein the connection member (A) is connected to a first electrode terminal of the battery cell via a safety element, the connection member (B) is coupled to a second electrode terminal of the battery cell, and the PCM is provided with a through hole, through which the connection member (B) is exposed.

Generally, the PCM, which is an additional member, is mounted to the upper end of the battery cell in a state in which the PCM is electrically connected to the upper end of the battery cell. In order to mount the PCM to the outside of the battery cell, therefore, complicated coupling between the PCM and the battery cell, including a large number of welding or soldering processes, is necessary. As a result, a defect rate is increased. In addition, a space necessary to mount the PCM to the battery cell is required.

In the PCM assembly according to the present invention, on the other hand, the connection members are coupled to the PCM using SMT, the connection member (A) is coupled to the battery cell in a state in which the connection member (A) extends from one end of the PCM assembly in the horizontal direction in a protruding fashion. Consequently, it is possible to greatly reduce a defect rate at the connection regions and to simplify an assembly process as compared with a conventional welding or soldering method.

Effects of the Invention

As is apparent from the above description, in a secondary battery pack according to the present invention, a connection member (A) is coupled to the bottom of a PCM in a state in which the connection member (A) extends from one end of the PCM assembly in the horizontal direction in a protruding fashion, and a connection member (B) is coupled to the bottom of the PCM in a state in which the top of the connection member (B) is exposed through a through hole of a PCB. Consequently, it is possible to reduce the number of manufacturing processes and to manufacture a battery pack having a more compact size. Also, in the battery pack having the above structure, the size of the upper space, in which the PCM assembly and the insulative mounting member are mounted, is reduced, and therefore, it is possible to increase battery capacity of the secondary battery pack as compared with other secondary battery packs having the same standard.

DESCRIPTION OF DRAWINGS

The above and other objects, features and other advantages of the present invention will be more clearly understood from the following detailed description taken in conjunction with the accompanying drawings, in which:

FIG. 1 is an exploded perspective view showing the upper end of a battery cell according to an embodiment of the present invention and an insulative cap, on which an insulative mounting member is loaded;

FIG. 2 is a partial perspective showing a state in which the insulative cap is mounted at the structure of FIG. 1;

FIG. 3 is a typical view showing a sheathing film attached to the outer surface of a battery case of FIG. 2;

FIG. 4 is a partial perspective view showing a state in which the insulative mounting member is mounted to the upper end of the battery cell;

FIG. 5 is a partial perspective view showing a state in which a protection circuit module (PCM) is mounted at the structure of FIG. 4;

FIG. 6 is a typical view showing a structure in which connection members are coupled to the bottom of a PCM assembly; and FIG. 7 is a side typical view of FIG. 6.

DETAILED DESCRIPTION OF THE INVENTION

Now, preferred embodiments of the present invention will be described in detail with reference to the accompanying drawings. It should be noted, however, that the scope of the present invention is not limited by the illustrated embodiments.

FIG. 1 is an exploded perspective view showing the upper end of a battery cell according to an embodiment of the present invention and an insulative cap, on which an insulative mounting member is loaded, FIG. 2 is a partial perspective view showing a state in which the insulative cap is mounted at the structure of FIG. 1, and FIG. 3 is a typical view showing a sheathing film attached to the outer surface of a battery case of FIG. 2.

Referring to these drawings, a secondary battery pack 100 is configured to have a structure including a battery cell 110, an electrically insulative mounting member 120 mounted to the top of the battery cell 110, a protection circuit module (PCM) 130, an insulative cap 140 mounted to the upper end of the battery cell 110 while surrounding the insulative mounting member 120, and a sheathing film 160 attached to the outer surface of a battery case of the battery cell 110 such that the sheathing film 160 surrounds the outer surface of the batter case of the battery cell 110.

The battery cell 110 is configured to have a structure in which an electrode assembly of a cathode/separator/anode structure is mounted in a battery case 150 made of aluminum together with an electrolyte in a sealed state, an anode terminal 111 protrudes from the middle of the top of the battery cell 110, and a cathode terminal 112 is formed at the top of the battery cell 110 excluding he anode terminal 111.

The insulative mounting member 120 is provided with an opening 121, through which the anode terminal 111 of the battery cell 110 is exposed.

A fastening protrusion 124 protrudes downward from the bottom of the insulative mounting member 120 and a fastening groove 114 corresponding to the fastening protrusion 124 is formed at the top of the battery cell 110 such that the insulative mounting member 120 is stably mounted to the battery cell 110.

The PCM 130 includes a protection circuit board (PCB) 133 loaded on the insulative mounting member 120, the PCB 133 having a protection circuit, and connection members 132 and 136 coupled to the bottom of the PCB 133. The connection member 136 is connected to the cathode terminal 112 via a positive temperature coefficient (PTC) element 137, and the connection member 132 is connected to the anode terminal 111. The PCB 133 is provided with a through hole 134, through which the connection member 132 is exposed.

The insulative cap 140 is made of an electrically insulation material. The electrically insulative cap 140 is formed to surround the insulative mounting member 120 in a state in which the connection members 132 and 136 and the protection circuit board 133 are loaded on the electrically insulative cap 140. Also, the insulative cap 140 is coupled to the top of the battery case by bonding.

A sheathing film 160, which displays product information while maintaining an electrically insulated state, is attached to the outer surface of the battery case. The sheathing film 160 is formed of a thermally shrinkable material. The sheathing film 160 is configured in the form of a tube, which surrounds the battery cell 110, is shrunk by heat applied to the tube, and comes into tight contact with the outer surface of the battery case of the battery cell 110.

FIG. 4 is a partial perspective view typically showing a state in which the insulative mounting member is mounted to the upper end of the battery cell Referring to FIG. 4 together with FIG. 1, the insulative mounting member 120 has a size 1 in the horizontal direction less than the size L of the top of the battery cell 110 such that the connection member 136 is connected to the battery cell 110. The insulative mounting member 120 is further provided with a second opening 123, through which a sealed electrolyte injection port 113 of the battery cell 110 is exposed upward.

Also, a receiving sidewall 125 protrudes upward from the top of the insulative mounting member 120 and fastening protrusions 126, 127, 128, and 129 are vertically formed at the receiving sidewall 125 such that a PCM assembly is stably mounted to the insulative mounting member 120. The receiving wall 125 has a first side, a second side, a first end and a second end. The pairs of fastening protrusion each include a first protrusion 126, 128 extending vertically from the first side and a second protrusion 127, 129 extending vertically from the second side.

FIG. 5 is a partial perspective view showing a state in which the PCM is mounted at the structure of FIG. 4, and FIG. 6 is a typical view showing a structure in which the connection members are coupled to the bottom of the PCM assembly.

Referring to these drawings together with FIGS. 1 to 4, the connection members 132 and 136 are coupled to the bottom of the PCB 133 by surface mount technology (SMT), and the connection member 132 is coupled to the bottom of the through hole 134 of the PCB 133.

Also, the PTC element 137 includes a PTC body 1371, a PCM coupling part 1372 coupled to the top of the PTC body 1371, and a battery cell coupling part 1373 coupled to the bottom of the PTC body 1371. The battery cell coupling part 1373 extends from one end of the PCM assembly in the horizontal direction in a protruding fashion such that the battery cell coupling part 1373 is exposed upward from the PCM assembly.

FIG. 7 is a side typical view of FIG. 6. Referring to FIG. 7 together with FIGS. 1 to 6, the sum H of the height of the receiving sidewall 125 and the heights of the protrusions 126, 127, 128, and 129 of the insulative mounting member 120 is equal to the height H of the PCB 133.

In the secondary battery pack 100 according to the present invention, therefore, the connection member 136 is electrically connected to the cathode terminal 112 of the battery cell 110 via the PTC element 137, and the connection member 132 is electrically connected to the anode terminal 111 of the battery cell 110 through the through hole 134 of the PCB 133, in a state in which the PCM 130 is loaded on the insulative mounting member 120. Consequently, electrical connection is achieved using a simple connection method. Also, the sum of the height of the PCM 130 and the height of the insulative cap 140 is 3 mm or less. Consequently, it is possible to manufacture a secondary battery pack having higher energy density than other secondary battery packs having the same standard.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A secondary battery pack comprising:
a battery cell having an electrode assembly of a cathode/separator/anode structure disposed in a battery case together with an electrolyte in a sealed state, the battery cell having an electrolyte injection port, a first electrode terminal and a second electrode terminal formed at a top thereof;
an electrically insulative mounting member having a first opening, through which the second electrode terminal of the battery cell is exposed and a second opening through which the electrolyte injection port is exposed, the electrically insulative mounting member being mounted to a top of the battery cell;
a protection circuit module (PCM) comprising a protection circuit board (PCB) loaded on the electrically insulative mounting member, the PCB having a protection circuit, and a connection member (A) and a connection member (B) coupled to a bottom of the PCB, the connection member (A) being connected to the first electrode terminal of the battery cell via a safety element, the connection member (B) being coupled to the second electrode terminal of the battery cell, the PCB being provided with a through hole, through which the connection member (B) is exposed; and
an insulative cap coupled to an upper end of the battery cell to surround the electrically insulative mounting member in a state in which the connection members and the protection circuit board are loaded on the insulative cap, wherein a sum of a height of the PCM and a height of the insulative cap is 3.0 mm or less, wherein a receiving sidewall protrudes upwardly front opposite sides of the electrically insulative mounting member and fastening protrusions are vertically formed in two pairs at upper edges of the receiving sidewall, the protrusions of each pair being formed across from each other on the opposite sides of the electrically insulative mounting member, the protrusions engaging notches in the PCM such that the PCM assembly is stably mounted to the electrically insulative mounting member, and wherein a bottom edge of the receiving sidewall has a notch, the notch being aligned with the second opening.

2. The secondary battery pack according to claim 1, wherein the battery case is a prismatic metal container.

3. The secondary battery pack according to claim 1, wherein the second electrode terminal is an anode terminal protruding from a middle of the top of the battery cell, and the first electrode terminal is a cathode terminal formed at the top of the battery cell excluding the anode terminal.

4. The secondary battery pack according to claim 1, wherein the connection members are coupled to a bottom of the PCB using surface mount technology (SMT).

5. The secondary battery pack according to claim 1, wherein the connection member (B) is coupled to a bottom of the through hole of the PCB.

6. The secondary battery pack according to claim 1, wherein the safety element is a positive temperature coefficient (PTC) element.

7. The secondary battery pack according to claim 6, wherein the PTC element comprises a PTC body, a PCM coupling part coupled to a top of the PTC body, and a battery cell coupling part coupled to a bottom of the PTC body, the battery cell coupling part extending from one end of a PCM assembly in a horizontal direction in a protruding fashion such that the battery cell coupling part is exposed upward from the PCM assembly.

8. The secondary battery pack according to claim 1, wherein the electrically insulative mounting member has a size in a horizontal direction less than that of the top of the battery cell to provide a region where the connection member (A) is connected to the battery cell, and the electrically insulative mounting member is further provided with the second opening, through which a case upper end protruding part ('sealed electrolyte injection port') of the battery cell is exposed upward.

9. The secondary battery pack according to claim 1, wherein a sum of a height of the receiving sidewall and heights of the protrusions is equal to a height of the PCB.

10. The secondary battery pack according to claim 1, wherein one or more fastening protrusions protrude downward from a bottom of the electrically insulative mounting member and fastening grooves corresponding to the fastening protrusions are formed at the top of the battery cell such that the electrically insulative mounting member is stably mounted to the battery cell.

11. The secondary battery pack according to claim 1, wherein the insulative cap is coupled to a top of the battery case by bonding.

12. The secondary battery pack according to claim 1, wherein a sheathing film is attached to an outer surface of the battery case.

13. The secondary battery pack according to claim 1, wherein the battery cell is a prismatic lithium secondary battery cell.

14. An assembly for mounting to a top of a battery cell, the assembly comprising:

an insulative mounting member having a first opening through which a second electrode terminal of the battery cell is exposed and a second opening through which an electrolyte injection port is exposed;

a PCM;

connection members (A and B) coupled to a bottom of the PCM using SMT; and external input and output terminals formed at a top of the PCM, wherein the connection member (A) is connected to a first electrode terminal of the battery cell via a safety element, the connection member (B) is coupled to a second electrode terminal of the battery cell, and the PCM is provided with a through hole, through which the connection member (B) is exposed, wherein a receiving sidewall protrudes upwardly from opposite sides of the insulative mounting member and fastening protrusions are vertically formed in two pairs at upper edges of the receiving sidewall, the protrusions of each pair being formed across from each other on the opposite sides of the insulative mounting member, the protrusions engaging notches in the PCM such that the PCM assembly is stably mounted to the insulative mounting member, and wherein a bottom edge of the receiving sidewall has a notch, the notch being aligned with the second opening.

15. The secondary battery pack according to claim 1, wherein the receiving wall has a first side, a second side, a first end and a second end, and wherein the fastening protrusions include a first protrusion extending vertically from the first side and a second protrusion extending vertically from the second side.

16. The assembly according to claim 14, wherein the receiving wall has a first side, a second side, a first end and a second end, and wherein the fastening protrusions include a first protrusion extending vertically from the first side and a second protrusion extending vertically from the second side.

17. The secondary battery pack according to claim 15, wherein the first protrusion and second protrusion are spaced from the first end and the second end.

18. The assembly according to claim 14, wherein the PCM includes a PCB, and wherein a combined height of the receiving sidewall and a height of the protrusions is equal to a height of the PCM.

* * * * *